(12) United States Patent
Ji et al.

(10) Patent No.: US 6,197,091 B1
(45) Date of Patent: Mar. 6, 2001

(54) OZONE PURIFICATION PROCESS

(75) Inventors: Wenchang Ji, Chalfont, PA (US); Robert James Ferrell, Rutherford; Piotr J. Sadkowski, Bridgewater, both of NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/263,614

(22) Filed: Mar. 5, 1999

(51) Int. Cl.$^7$ ................................................ B01D 53/22
(52) U.S. Cl. .................................. 95/45; 95/96; 95/230
(58) Field of Search .............................. 95/45, 47–55, 95/96, 230; 96/4, 7–14; 204/176; 422/186.07, 186.08, 186.11, 186.12

(56) References Cited

U.S. PATENT DOCUMENTS

| | | | |
|---|---|---|---|
| 2,966,235 | * 12/1960 | Kammermeyer | 95/51 |
| 3,274,750 | * 9/1966 | Robb | 95/45 |
| 3,369,343 | * 2/1968 | Robb | 95/51 X |
| 3,911,080 | * 10/1975 | Mehl et al. | 95/45 X |
| 4,430,306 | * 2/1984 | Namba et al. | 422/186.07 X |
| 4,717,407 | * 1/1988 | Choe et al. | 95/53 X |
| 4,929,357 | * 5/1990 | Schucker | 95/50 X |
| 5,051,113 | * 9/1991 | Nemser | 95/54 |
| 5,051,114 | * 9/1991 | Nemser et al. | 95/47 |
| 5,053,059 | * 10/1991 | Nemser | 95/54 |
| 5,147,417 | * 9/1992 | Nemser | 95/54 |
| 5,215,554 | * 6/1993 | Kramer et al. | 95/55 X |
| 5,236,673 | * 8/1993 | Coakley et al. | 422/186.07 |
| 5,288,304 | * 2/1994 | Koros et al. | 95/45 |
| 5,332,424 | * 7/1994 | Rao et al. | 95/49 X |
| 5,503,808 | * 4/1996 | Garbutt et al. | 422/186.07 X |
| 5,507,957 | * 4/1996 | Garrett et al. | 95/96 X |
| 5,520,887 | * 5/1996 | Shimizu et al. | 422/186.07 X |
| 5,656,246 | * 8/1997 | Patapoff et al. | 422/186.07 X |
| 5,679,133 | * 10/1997 | Moll et al. | 95/45 |
| 5,700,375 | * 12/1997 | Hagen et al. | 95/45 X |
| 5,756,054 | * 5/1998 | Wong et al. | 422/186.08 |

FOREIGN PATENT DOCUMENTS

| | | | |
|---|---|---|---|
| 63-248418 | * 10/1988 | (JP) | 95/45 |
| 4-284814 | * 10/1992 | (JP) | 95/50 |
| 7-247102 | 9/1995 | (JP) . | |

OTHER PUBLICATIONS

Patent Abstracts of Japan, vol. 1996, No. 01, Jan. 31, 1996 (1996–01–31) & JP 07 247102 A (Nippon Sanso KK), Sep. 26, 1995 (1995–09–26) *abstract*.

Shanbhag, Sirkar, "Ozone and Oxygen Permeation Behavior of Silicone Capillary Membranes Employed in Membrane Ozonators", Journal of Applied Polymer Science, vol. 69, No. 7, 1998, pp. 1263–1273.

Shanbhag et al., "Membrane–Based Ozonation of Organic Compounds", Ind. Eng. Chem. Res. 1998, 37, 4388–4398.

* cited by examiner

*Primary Examiner*—Robert H. Spitzer
(74) *Attorney, Agent, or Firm*—Philip H. Von Neida; Salvatore P. Pace

(57) ABSTRACT

An ozone-oxygen gas stream produced by passing oxygen into an ozone generator is introduced into a membrane separation unit containing an ozone-permeable membrane. Ozone-enriched gas passes through the membrane and is recovered or it contacts a liquid or gas stream which contains ozone-reactive substances, thereby oxidizing the substances. The oxygen-enriched gas stream produced on the feed side of the membrane by permeation of ozone through the membrane is recycled to the ozone generator. Prior to being recycled, the oxygen-enriched stream may be purified to remove gaseous impurities which permeate through the membrane from the liquid or gas stream being treated.

22 Claims, 1 Drawing Sheet

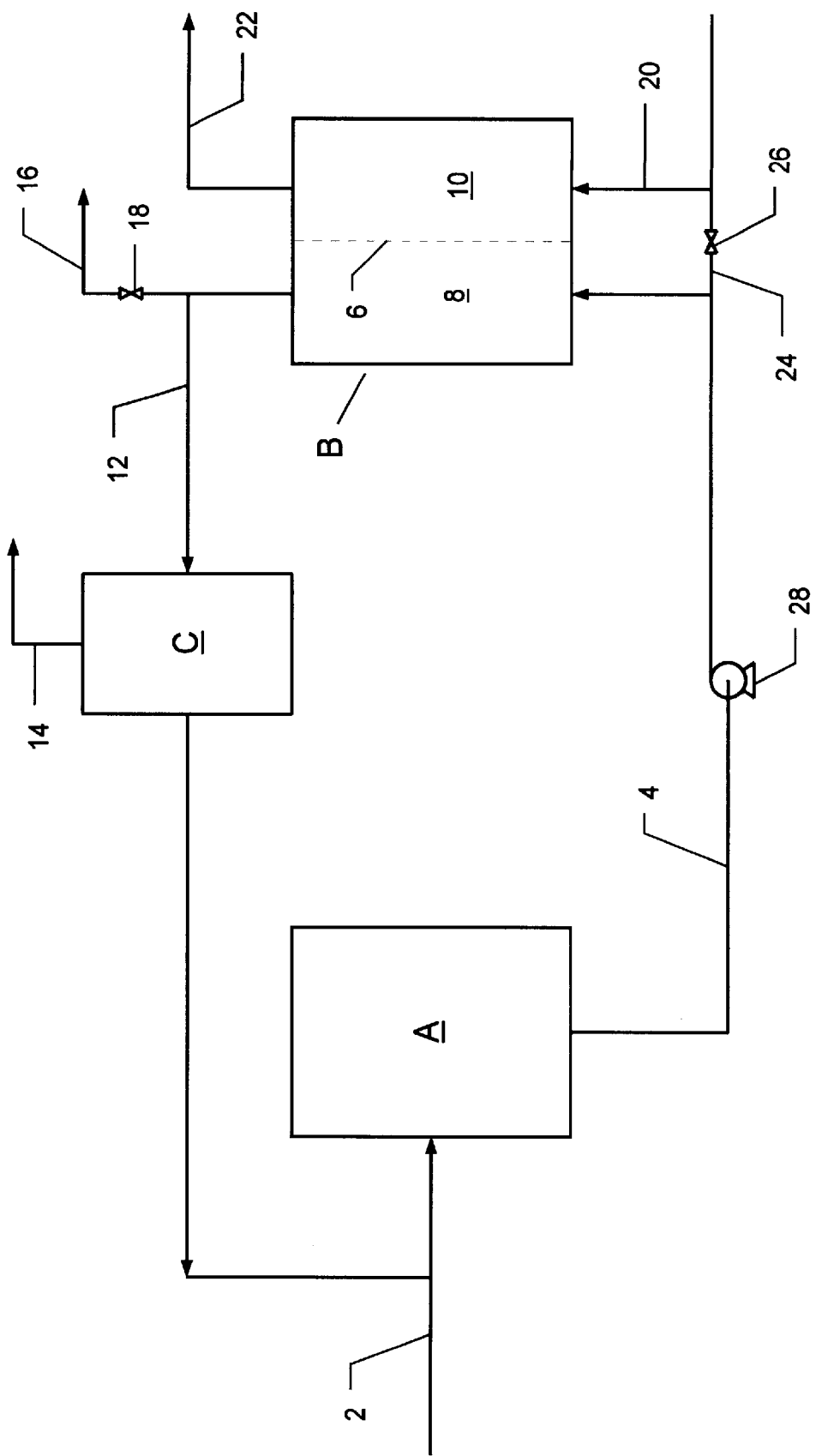

OZONE PURIFICATION PROCESS

FIELD OF THE INVENTION

This invention relates to the production of ozone, and more particularly to the production of ozone by ozonizing oxygen and recycling unreacted oxygen to the ozone generator.

BACKGROUND OF THE INVENTION

Ozone is a very useful agent for destroying harmful or undesirable chemical compounds and microbiological agents found in fluids such as drinking water, aqueous sewage, air and waste gases, etc. It accomplishes this by, for example, oxidizing such chemical compounds to harmless or less undesirable compounds and oxidizing or lysing the microbiological agents, thereby destroying them. Ozone is generally produced on a commercial scale by subjecting substantially pure oxygen to a high voltage discharge, which causes some of the oxygen to be converted to ozone. Conventional ozone generators produce a product stream containing about 10% by weight ozone, which is satisfactory for many ozone applications. However, because the efficiency of some industrial ozone-based processes, such as waste water treatment and pulp and paper bleaching operations, is directly proportional to the concentration of ozone in the treatment gas fed to the processes, there is a demand for equipment that can produce ozone product gases which contain higher ozone concentrations than do currently available ozone gas products. In response to this demand, equipment manufacturers have made improvements in ozone generators which make it possible to make ozone product gas containing up to about 14% by weight ozone. However, the improved ozone generators are considerably more costly to operate than are earlier ozone generators, since the improved generators consume significantly more power than do the earlier generators.

Waste water treatment and paper and pulp plant operators would like to have available ozone generating equipment that can produce ozone gas products containing up to 20% by weight or more ozone, but equipment having such capability is not currently available. Furthermore, even if such equipment were available, it would be prohibitively expensive to operate because of the very high power consumption that would be required to produce ozone gas of this quality.

Because of the continuing need for product gas containing high concentrations of ozone, techniques other than increasing the effectiveness of ozone generators per se have been investigated. For example, attempts have been made to increase the ozone concentration of generated ozone-oxygen gas mixtures by removing oxygen from the gas stream. One procedure that has been tried involves subjecting the gas stream to adsorptive separation. Ozone is generally more strongly adsorbed by adsorbent materials than is oxygen and thus it can be readily separated from oxygen by adsorption-based processes. However the sorbed ozone component cannot be recovered from the adsorption equipment until the adsorbent regeneration phase of the separation process. Since ozone is highly unstable, it is difficult or impossible to recover the ozone product stream from the adsorption equipment without some decomposition of the ozone. A further complication of ozone-oxygen adsorptive separation processes is the fact that some adsorbents actually catalyze the decomposition of ozone.

The present invention provides an efficient and effective method of increasing the ozone concentration of generated ozone-oxygen gas mixtures without significantly raising the cost of producing the gas mixtures. It accomplishes this by ozonizing a stream of oxygen to produce an ozone-oxygen mixture, then separating ozone from oxygen using an ozone-selective membrane, and finally recycling nonpermeated oxygen to the ozone generator. Additional advantages provided by the invention are that the size of downstream equipment can be reduced, and the efficiency of fluid treatment processes is enhanced by use of the ozone-enriched product gas of the invention in fluid treatment processes.

U.S. Pat. No. 5,507,957 discloses an ozone generating system in which oxygen is separated from air in an adsorption vessel and the separated oxygen is subjected to ozonization to produce an ozone-containing stream, which is recycled to the adsorption vessel. Ozone in the recycle stream is adsorbed by a preliminary bed of adsorbent and the oxygen contained in the recycle stream, passes through the preliminary adsorbent and is recycled to the ozonizer. The ozone is recovered during the adsorbent regeneration step.

U.S. Pat. No. 5,756,054 discloses an ozone generating system in which liquid oxygen from a cryogenic oxygen source is subjected to ozonization to produce an ozone-containing product gas, ozone is separated from the product gas by condensation and the gaseous oxygen fraction is recycled to the cryogenic oxygen source.

Shanbhag et al., "Membrane-Based Ozonization of Organic Compounds", Ind. Eng. Chem. Res., vol. 37, 1998, pp. 4388–4398 describes the ozonation of water which contains organic pollutants by contacting a silicone membrane with an ozone-oxygen gas mixture. Ozone from the gas mixture passes through the membrane and contacts the pollutant-containing water on the permeate side of the membrane.

SUMMARY OF THE INVENTION

The system of the invention comprises an ozone generator and a fluid treatment unit which contains an ozone-permeable membrane. Oxygen is fed into the ozone generator to produce an ozone-containing gas. The ozone-containing gas is introduced into the feed side of the fluid treatment unit wherein some or all of the ozone contained in the gas permeates through the membrane. The oxygen-enriched gas that remains in the feed side of the membrane after depletion of ozone is optionally purified and recycled to the ozone generator as supplemental feed. In a preferred embodiment, a liquid or gas fluid stream which contains ozone-reactive substances is passed through the permeate side of the gas separator. Ozone passing through the membrane mixes with the impurity-containing liquid or gas and oxidizes the impurities to harmless or easily removable components.

Specifically, in a first broad embodiment, the invention comprises a process comprising the steps:

(a) passing an oxygen-containing gas through an ozone generator, thereby producing a gaseous product comprising ozone and oxygen;

(b) introducing the gaseous product into the feed zone of gas separation means comprising a feed zone and a permeate zone separated by at least one ozone-permeable membrane, thereby permeating an ozone-enriched stream through the membrane and into the permeate zone, and producing an oxygen-enriched stream in the feed zone; and (c) recycling the oxygen-enriched stream to the ozone generator.

In a preferred embodiment the oxygen-containing gas is oxygen-enriched air or substantially pure oxygen. In a more preferred embodiment, the oxygen-containing gas is substantially pure oxygen.

According to another preferred embodiment, the process further comprises introducing a fluid stream into the permeate zone. In this preferred embodiment the fluid stream may contain one or more ozone-reactive substances.

In another preferred embodiment, the fluid stream is a liquid stream. In a more preferred embodiment, the fluid stream is an aqueous stream. In this preferred embodiment, the one or more ozone-reactive substances generally comprise organic compounds, microbiological agents or mixtures thereof. In one aspect of this preferred embodiment, the ozone-enriched stream enters the permeate zone in a manner such that it nondispersively mixes with the liquid stream in the permeate zone. In another aspect of this embodiment, the total pressure in the permeate zone is at least as great as the total pressure in the feed zone. The liquid stream may be an aqueous stream. The aqueous stream may be drinking water or wastewater. The aqueous stream may contain one or more ozone-reactive substances comprising organic compounds, microbiological agents or mixtures thereof.

In another preferred embodiment, the fluid stream is a gaseous stream. In this preferred embodiment, the oxygen partial pressure in the permeate zone is preferably maintained as great as or greater than the oxygen partial pressure in the feed zone. The gaseous stream can be, for example, air, for example, the air feed to an air separation plant, a breathable gas, for example, an oxygen-nitrogen gas mixture, or an exhaust gas from a combustion process. In this preferred embodiment, the one or more ozone-reactive substances can comprise hydrogen, carbon monoxide, organic compounds, such as hydrocarbons, nitrogen compounds, sulfur compounds, microbiological agents or mixtures thereof. In a more specific aspect of this preferred embodiment, the one or more ozone-reactive substances comprises one or more of hydrogen; carbon monoxide; hydrocarbons, such as methane, acetylene, propylene, etc.; nitrogen oxides, such as nitric oxide, nitrogen dioxide, etc.; sulfur compounds, such as sulfur dioxide, hydrogen sulfide, etc.; viruses, living organisms or mixtures thereof.

In any of the above embodiments, the invention may additionally comprise the step of removing gaseous impurities from the oxygen-enriched stream prior to step (c). In one aspect, the step of removing gaseous impurities from the oxygen-enriched stream may comprise drying the oxygen-enriched stream. In this or another aspect, the step of removing gaseous impurities from the oxygen-enriched stream may comprise the use of adsorptive separation, membrane separation or combinations thereof. In a preferred aspect, the step of removing gaseous impurities from the oxygen-enriched stream comprises adsorptive separation carried out using one or more zeolites, activated carbon, carbon molecular sieves or combinations thereof.

In a preferred aspect of the process embodiment of the invention, the ozone-permeable membrane comprises polymeric membranes, inorganic membranes, inorganic-organic membranes or combinations thereof. In a more preferred aspect of this embodiment, the ozone-permeable membrane comprises elastomeric polymers, glassy polymers, ion-exchange resins, zeolites, carbon molecular sieves, metal oxides, zeolite-filled polymers, carbon molecular sieve-filled polymers and combinations thereof. In a most preferred aspect of this embodiment, the ozone-permeable membrane comprises perfluoro-2,2-dimethyl-1,3-dioxole-tetrafluoroethylene copolymer, tetrafluoroethylene-perfluoro-3,6-dioxa-4-methyl-7-octene-sulfonic acid copolymer, silicone rubber, silica or combinations thereof.

In another preferred aspect of the process embodiment of the invention, the membrane is hydrophobic, organophobic or both of these.

According to another broad embodiment, the invention comprises apparatus for producing an ozone-enriched stream comprising:

(a) an ozone generator having a fluid inlet and a fluid outlet;

(b) gas separation means having a feed zone and a permeate zone, the feed zone and the permeate zone being separated by an ozone-permeable membrane and the feed zone having a fluid inlet and a retentate fluid outlet;

(c) first conduit means connecting the product outlet to the fluid inlet of the feed zone;

(d) second conduit means connecting the retentate fluid outlet to the fluid inlet of the ozone generator; and (e) means to cause fluid to flow through the first and second conduit means.

In a preferred embodiment, the permeate zone has a fluid inlet and a fluid outlet. In another preferred embodiment, the apparatus additionally includes means for pressurizing and/or evacuating the permeate zone. In another preferred embodiment, the second conduit means further comprises fluid purification means. In a more preferred embodiment, the fluid purification means comprises means for removing water vapor, gaseous inorganic impurities, gaseous organic impurities and combinations thereof.

In a preferred aspect of the apparatus embodiment of the invention, the ozone-permeable membrane comprises polymeric membranes, inorganic membranes, inorganic-organic membranes or combinations thereof. In a more preferred aspect of this embodiment, the ozone-permeable membrane comprises elastomeric polymers, glassy polymers, ion-exchange resins, zeolites, carbon molecular sieves, metal oxides, zeolite-filled polymers, carbon molecular sieve-filled polymers and combinations thereof. In a most preferred aspect of this embodiment, the ozone-permeable membrane comprises perfluoro-2,2-dimethyl-1,3-dioxole-tetrafluoroethylene copolymer, tetrafluoroethylene-perfluoro-3,6-dioxa-4-methyl-7-octene-sulfonic acid copolymer, silicone rubber, silica or combinations thereof.

In another preferred aspect of the apparatus embodiment, the membrane is hydrophobic, organophobic or both of these.

BRIEF DESCRIPTION OF THE DRAWING

FIG. 1 is a schematic representation of a system in which the process of the invention is carried out.

Only those valves, lines and equipment necessary for an understanding of the invention have been included in the drawing.

DETAILED DESCRIPTION OF THE INVENTION

The invention can be used to more economically and more efficiently produce ozone gas product streams having very high ozone concentrations. This is accomplished by ozonizing an oxygen-containing gas, thereby producing an ozone-oxygen gas stream; contacting part or all of the ozone-oxygen gas with a membrane which is more permeable to ozone than it is to oxygen, thereby producing an ozone enriched gas on the permeate side of the membrane and an oxygen-enriched gas on the feed side of the membrane; removing the ozone-enriched gas from the permeate side of the membrane; and recycling some or all of the oxygen-enriched gas to the ozone regenerator as supplemental feed gas. The invention improves the efficiency of ozone generation processes by recycling nonpermeated oxygen to any extent, even to extinction, if desired, while at the same time, increasing the ozone concentration in ozone generator effluents considerably beyond the maximum concentration that can be produced by currently available ozone generating equipment.

The invention can be more easily understood by reference to the appended drawing. Illustrated therein is an ozone generator and enrichment system comprising an ozone generator, A, an ozone separator/reactor, B and an optional oxygen purification plant, C.

Ozone generator A can be any type of ozonizer, such as an electrical corona discharge generator, and the design and operation of this device forms no part of the invention. Line 2 connects a source of oxygen-containing gas to the feed end of ozonizer A. Ozone product gas line 4 connects the outlet end of ozonizer A to the feed inlet end of separator/reactor B.

Separator/reactor B contains membrane device 6, which divides the separator/reactor into two chambers: feed chamber 8 and permeate chamber 10. The membrane device can be any membrane which is permeable to ozone, but is preferable constructed of a material which is more permeable to ozone than it is to oxygen.

Membranes determined to be useful in the apparatus and process of the invention include ozone-compatible polymeric membranes, inorganic membranes, organic-inorganic membranes and combinations thereof. The term "ozone-compatible", as used herein with reference to membranes, means membranes constructed from materials that are reasonably stable in the presence of ozone, i.e., they are not readily oxidized by ozone and are not otherwise readily adversely altered by ozone. Suitable polymeric membranes include those made from elastomeric polymers, such as silicone rubber; glassy polymers, such as those made from perfluoro-2,2-dimethyl-1,3-dioxole-tetrafluoroethylene copolymers; ion-exchange resins, such as tetrafluoroethylene-perfluoro-3,6-dioxa-4-methyl-7-octene-sulfonic acid copolymer, and combinations of these. Suitable inorganic membranes include those made from zeolites, carbon molecular sieves, metal oxides and combinations of these. Suitable organic-inorganic membranes include zeolite-filled polymeric membranes, carbon molecular sieve-filled polymeric membranes and combinations of these.

Preferred membranes are those made from zeolites, silica, perfluoro-2,2-dimethyl-1,3-dioxole-tetrafluoroethylene (PDD-TFE) copolymers, tetrafluoroethylene-perfluoro-3,6-dioxa-4-methyl-7-octene-sulfonic acid copolymers, silicone rubbers (PDMS) and mixtures thereof.

The most useful membranes for use in the invention are those that are hydrophobic and/or or oleophobic or organophobic, i.e., those that have a low permeability to water and/or oil-based or organic compounds, e.g., PDD-TFE copolymer and PDMS membranes.

The membrane may be of any desired construction, for example it may be in the form of a flat sheet (as depicted in the appended drawing), and may comprise a single layer or have a composite construction comprising, for example, a substrate layer and a top layer of one or more of the above described ozone-permeable substances. Furthermore, the membrane may be in the form of bundles of tubes or hollow fibers packed, for example, in a hollow shell module. In the latter case, it is preferred that the ozone-containing gas be passed through the fibers, such that the interior portions of the tubes or hollow fibers constitute feed chamber 8 and the shell side of the bundles constitutes permeate chamber 10 of separator/reactor B. The particular details of design and construction of the membrane are a matter of choice and form no part of this invention.

As more fully described below, separator/reactor B can serve to simply separate ozone from the ozone-containing feed gas, or it can be used to separate ozone from the feed gas and to treat an ozone-reactable substance-containing liquid or gaseous fluid by contacting the separated ozone with the fluid on the permeate side of membrane 6.

Ozone-reactive substances that can be destroyed or rendered harmless by the liquid or gas purification embodiments of the invention include hydrogen, carbon monoxide, nitrogen compounds, sulfur compounds, organic compounds, microbiological agents. etc. and mixtures of these. Treatable impurities contained in liquid streams, such as waste water streams, drinking water and semiconductor component cleaning liquids, generally include organic compounds and microbiological agents, such as viruses, living organisms, e.g., bacteria, protozoa, fungi, parasites, etc. Treatable impurities found in gas streams, such as combustion gases, atmospheric air, e.g., hospital and office air, and other breathable gases, such as oxygen-nitrogen and oxygen-helium mixtures and medical oxygen, include hydrogen, carbon monoxide, organic compounds, such as hydrocarbons, nitrogen compounds, sulfur compounds, microbiological agents or mixtures thereof. Typically, these gases contain lower hydrocarbons, i.e., hydrocarbons having 1 to 6 carbon atoms, such as methane, acetylene, propylene, etc.; nitrogen oxides, such as nitric oxide, nitrogen dioxide, etc.; sulfur compounds, such as sulfur dioxide, hydrogen sulfide, etc.; viruses; living organisms; etc.; and mixtures of these.

In the illustrated system, ozone product gas line 4 is connected to feed chamber 8 of separator/reactor B. Also connected to feed chamber 8 is oxygen recycle line 12, which, on its downstream end, is connected to the inlet end of ozone generator A. Recycle line 12 can be joined to line 2, upstream of ozonizer A, or it can be connected directly to ozonizer A. Gas purifier C, which is optional in the system and which may comprise one or more gas purification units, is shown as connected to recycle line 12. This equipment serves to remove gaseous or other impurities that enter the system with the oxygen feed gas passing through line 2 or which pass through membrane 6 from chamber 10. Typical purification equipment includes a gas drying unit, such as a desiccant-containing unit, nitrogen and/or argon separators, such as adsorption and/or membrane separation units, and other separation devices that remove gaseous or vaporized impurities from the system. Such impurities include the above-described substances that were originally present in the fluid being purified and not reacted with the ozone, and products of reactions between ozone and the substances originally present, such as $N_2O_5$ and $SO_3$. The latter compounds can be easily removed from the oxygen-enriched gas stream by water scrubbing.

Typical of equipment for removing such impurities are adsorption and absorption units, scrubbers, membrane separation units, condensers, etc. The separated impurities are removed from the system through line 14, and discharged to the atmosphere or sent to suitable storage or disposal means.

The system illustrated in the drawing is also provided with vent line 16, flow through which is controlled by shutoff valve 18. Line 16 is preferably connected to line 12 upstream of gas purifier C. Permeate chamber 10 is also provided with fluid supply stream line 20 and fluid discharge line 22, and oxygen purge line 24, provided with shutoff valve 26, connects line 4 to chamber 10 via line 20. The system illustrated in the drawing includes optional gas pumping means 28, positioned in line 4.

In practicing the process of the invention, an oxygen-containing feed gas, preferably oxygen-enriched air or substantially pure oxygen is introduced into ozonizer A through line 2. For purposes of this invention, the term "oxygen-enriched air" means gaseous or liquid air that contains more oxygen than naturally occurs in atmospheric air, i.e., air containing about 21% oxygen; and "substantially pure oxygen" means a gaseous or liquid stream that contains at least about 95% oxygen. As the feed gas passes through ozonizer A, a portion of the oxygen contained in the gas is converted to ozone by, for example, exposing the feed gas to an electrical corona discharge. The ozone-containing product gas, which may contain as much as 10% by weight or more of ozone, exits ozonizer A through line 4 and enters feed chamber 8 of separator/reactor B. If it is desired to introduce the product gas into chamber 8 at a pressure higher than the pressure at which the product gas exits ozonizer A, this can be accomplished by means of gas pumping means 28, which can be used to raise the pressure of the product gas to any desired pressure. Suitable gas pumping means include blowers, compressors, etc. As the feed gas passes through chamber 8, an ozone-enriched stream permeates through membrane 6 and passes into permeate chamber 10.

During the separation process, separator B can be maintained at any desired temperature and pressure. In general, the temperature of the feed gas entering separator B is maintained in the range of about −80 to about 200° C., and is preferably maintained in the range of about 0 to about 300° C.; and the pressure in chamber 8 is generally maintained in the range of about 1 to about 15 bara (bar, absolute), and is preferably maintained in the range of about 2 to about 10 bara. The pressure at which chamber 10 is maintained will depend upon the type of operation that is conducted in separator/reactor B, as further explained below.

The relative concentration of ozone and oxygen in the gas permeating through membrane 6 will depend, inter alia, upon the selectivity of membrane 6, which varies from one membrane to another, and the conditions maintained in separator/reactor B. Ideally, the conditions in separator/reactor B are maintained such that substantially all of the ozone in the product gas passes through membrane 6, so that the gas reaching the outlet end of chamber 8 is oxygen-enriched and substantially ozone-free. The oxygen-enriched gas leaves chamber 8 through line 12 and enters purifier C, when this plant is included in the system. Nitrogen, water vapor and/or other impurities are removed from the oxygen-enriched gas in purifier C by the above-described well-known techniques, and the remaining gas, now preferably having substantially the same oxygen concentration as the feed gas entering the system through line 2, is combined with the feed gas for reintroduction into ozonizer A.

In the event that purifier C is not included in the system, or if purifier C does not remove substantially all of the impurities contained in the oxygen-enriched gas leaving chamber 8 through line 12, it may be desirable or necessary to vent a portion of this gas from the system to prevent the buildup of impurities in the system. This can be accomplished by continuously or intermittently venting oxygen-enriched gas from line 12 through valve 18 and line 16.

In one embodiment of the invention, the ozone-enriched gas produced is intended for use in an application remote from the system illustrated in the drawing. In this case unit B serves to separate ozone from oxygen. To maintain high ozone selectivity of membrane 6 in the separator/reactor, ozone is continuously removed from permeate chamber 10. This can be accomplished by evacuating chamber 10 by means of suitable vacuum-producing means positioned, for example, in line 22 (not shown), but is preferably accomplished by sweeping chamber 10 with a carrier gas (with or without the aid of evacuation means). Vacuum producing means include vacuum pumps, venturi type gas/liquid or gas/gas mixing devices, such as eductors or ejectors, or combinations of these, generally positioned in downstream treatment systems. Suitable carrier gases are those which will not react with ozone and which are not incompatible with the intended purpose of the ozone. Useful carrier gases include nitrogen, argon and carbon dioxide. Nitrogen is a preferred carrier gas. The carrier gas is introduced into chamber 10 through line 20, and as it passes across the permeate surface of membrane 6, it sweeps ozone-enriched permeate gas therefrom. The ozone-enriched gas/carrier gas mixture is discharged from chamber 10 through line 22, and it is sent to a downstream application or to storage.

In some applications it may be desirable to produce ozone-enriched gases which contain only ozone and oxygen. This is often the case when oxygen has a beneficial effect in the end use application, such as when the gas is to be used to purify waste water streams containing impurities that are oxidized by both ozone and oxygen. In this case a portion of the ozone product gas passing through line 4 can be used as a sweep gas for chamber 10. This is accomplished by opening valve 26 and permitting some of the ozone product gas to flow through line 24 and into chamber 10. Alternatively, and perhaps less advantageously, a portion of the oxygen-enriched gas flowing through line 12 can be diverted to chamber 10 for use as a permeate side sweep gas.

In another embodiment of the invention, ozone-reactive substances contained in a liquid stream are destroyed, or converted to substances that are not objectionable or which can be more easily removed from the stream by directly contacting the liquid stream with ozone-enriched gas in chamber 10 of separator/reactor B. Although this embodiment can be applied to any liquid that can be safely contacted with ozone-oxygen mixtures, its principal application is in the treatment of aqueous liquids such as drinking water or waste water streams, which may contain various ozone-reactive substances or impurities, including organic compounds and microbiological agents, such as viruses, living organisms, e.g., bacteria, protozoa, fungi, parasites, etc. The impurity-containing liquid is introduced under pressure into chamber 10 through line 20, and the purified liquid is removed from chamber 10 through line 22.

Since ozone is a much more powerful oxidizing agent than oxygen, it is preferred that the ozone enriched gas mixing with the liquid being treated contain as much ozone as possible. In other words, it is desirable to repress permeation of oxygen through membrane 6 into chamber 10. This is accomplished, for example, when contact between the ozone-enriched gas permeating into chamber 10 and the liquid being treated therein takes place under conditions such that the ozone-enriched gas combines nondispersively with the liquid being treated. In other words, the ozone-enriched gas mixes with the liquid being treated without forming a two-phase system, i.e., without causing bubbles to form in the liquid being processed. If a gas phase is not permitted to form in chamber 10, the quantity of ozone and oxygen that enters chamber 10 will be limited to the amount of these compounds that is consumed by reaction with ozone-reactive substances in the liquid and/or dissolved or absorbed by the liquid in chamber 10. Since ozone reacts very quickly with ozone-reactive substances, the rate of permeation of ozone through membrane 6 will remain very high as long as ozone-reactive substances are present in the liquid in chamber 10. On the other hand, oxygen reacts more slowly with ozone-reactive substances than does ozone, so that, initially, excess oxygen will be present in the liquid in chamber 10. However, since no bubbles form in the liquid being treated in chamber 10, substantially the only oxygen that exists in chamber 10 is oxygen that is dissolved or absorbed by the liquid. Since the solubility of oxygen in liquids such as aqueous liquids is relatively low; most of the oxygen entering chamber 8 in the ozone-containing product gas will exit chamber 8 via line 12 and will be recycled to ozonizer A.

Another advantage of operating separator/reactor B under conditions such that ozone-enriched gas mixes nondispersively with the liquid passing through chamber 10 is that ozone reacts more quickly in liquid phase systems than it does in two-phase, gas-liquid systems, and is thus more efficiently utilized in liquid phase systems.

Nondispersive mixing of the ozone-enriched gas and the liquid being treated in chamber 10 can be accomplished, for example, by maintaining the pressure in vessel 10 higher than the pressure in chamber 8. This prevents the formation of bubbles in the liquid in chamber 10.

In another embodiment of the invention, the ozone-containing product gas produced in ozonizer A is used to destroy ozone-reactive substances contained in gas streams. In this embodiment, a gas stream, such as breathable gases, air feed to an air separation plant, for example, a cryogenic air separation plant, or a waste gas from a combustion process or a chemical process, is introduced into chamber 10 through line 20, contacted with ozone-enriched gas in chamber 10, and withdrawn from this chamber through line 22. As was the case in the liquid phase embodiment described above, the ozone reacts with the ozone-reactive substances contained in the gas streams being treated. When present, hydrogen and carbon monoxide, are oxidized to water and carbon dioxide, respectively, lower hydrocarbons can be oxidized to carbon dioxide and water, microbiological agents are destroyed or rendered harmless, and the nitrogen oxides, for example nitric oxide and nitrogen dioxide, and sulfur oxides are oxidized to compounds having higher oxidation states, such as $N_2O_5$ and $SO_3$, which are converted to nitric acid and sulfuric acid, respectively, upon contact with water. These acids can be scrubbed from the system or easily converted to harmless salts by reaction with basic substances.

In the gas treatment embodiment of the invention, ozone readily reacts with the ozone reactive components, and oxygen, which is less rapidly consumed than is ozone, tends to build up in concentration in the gas being treated in chamber 10. This tendency can be offset by operating the reaction process under conditions such that permeation of oxygen through membrane 6 is repressed or prevented. This can be accomplished, for example, by maintaining the partial pressure of oxygen in chamber 10 near, and preferably equal to or higher than, the oxygen partial pressure in chamber 8. This is done by raising the total pressure in chamber 10 sufficiently high to attain the desired oxygen partial pressure. Since ozone readily reacts with the impurities in chamber 10, the partial pressure of ozone in chamber 10 will remain low and ozone will continue to rapidly permeate through membrane 6.

It can be appreciated that in each of the above applications gaseous or vaporized impurities may permeate through membrane 6 from chamber 10 to chamber 8 due to the lower partial pressure of the impurities in chamber 8, relative to that in chamber 10. This is exacerbated when, for example, the total pressure in chamber 10 is maintained higher than the total pressure in chamber 8. Various measures can be taken to prevent or repress the permeation of the impurities from chamber 10 to chamber 8. For example, as mentioned above, a membrane that is impermeable to certain impurities can be selected for use in separator/reactor B. Hydrophobic membranes will prevent or retard permeation of water vapor through them and organophobic membranes will prevent or retard permeation of certain organic substances through them. Impurities that do permeate through membrane 6 can be removed from the gas passing through line 12, if desired or necessary, by incorporating appropriate gas purification systems in line 12, for example in purifier C. Suitable gas purifying means are described above.

It will be appreciated that it is within the scope of the present invention to utilize conventional equipment to monitor and automatically regulate the flow of gases within the system so that it can be fully automated to run continuously in an efficient manner.

Although the invention has been described with particular reference to specific equipment arrangements and membranes and to the purification of specific fluids, these features are merely exemplary of the invention and variations are contemplated. The scope of the invention is limited only by the breadth of the appended claims.

What is claimed is:

1. A process comprising the steps:
    (a) passing an oxygen-containing gas through an ozone generator, thereby producing a gaseous product comprising ozone and oxygen;
    (b) introducing said gaseous product into the feed zone of gas separation means comprising a feed zone and a permeate zone separated by at least one ozone-permeable membrane, thereby permeating an ozone-enriched stream into said permeate zone and producing an oxygen-enriched stream in said feed zone;
    (c) introducing a fluid stream into said permeate zone; and
    (d) recycling said oxygen-enriched stream to said ozone generator.

2. The process of claim 1, wherein said oxygen-containing gas is oxygen-enriched air or substantially pure oxygen.

3. The process of claim 1, wherein said oxygen-containing gas is substantially pure oxygen.

4. The process of claim 3, wherein said ozone-permeable membrane comprises polymeric membranes, inorganic membranes, inorganic-organic membranes or combinations thereof.

5. The process of claim 3, wherein said ozone-permeable membrane comprises elastomeric polymers, glassy polymers, ion-exchange resins, zeolites, carbon molecular sieves, metal oxides, zeolite-filled polymers, carbon molecular sieve-filled polymers and combinations thereof.

6. The process of claim 3, wherein said ozone-permeable membrane comprises perfluoro-2,2-dimethyl-1,3-dioxole-tetrafluoroethylene copolymer, tetrafluoroethylene-perfluoro-3,6-dioxa-4-methyl-7-octene-sulfonic acid copolymer, silicone rubber, silica or combinations thereof.

7. The process of claim 1, wherein said fluid stream contains one or more ozone-reactive substances.

8. The process of claim 7, wherein said one or more ozone-reactive substances comprises hydrogen, carbon monoxide, nitrogen compounds, sulfur compounds, organic compounds, microbiological agents or mixtures thereof.

9. The process of claim 8, wherein said fluid stream is a liquid stream.

10. The process of claim 9, wherein said ozone-enriched stream nondispersively mixes with said liquid stream in said permeate zone.

11. The process of claim 10, wherein said liquid stream is an aqueous stream.

12. The process of claim 11, wherein the total pressure in said permeate zone is at least as great as the total pressure in said feed zone.

13. The process of claim 11, wherein said aqueous stream is drinking water, semiconductor component cleaning liquid or wastewater.

14. The process of claim 9, wherein said membrane is hydrophobic, organophobic or both of these.

15. The process of claim 8, wherein said fluid stream is a gaseous stream.

16. The process of claim 15, wherein the oxygen partial pressure in said permeate zone is maintained at least as great as the oxygen partial pressure in said feed zone.

17. The process of claim 15, wherein said gaseous stream is air, breathable gas or an exhaust gas from a combustion process.

18. The process of claim 8, wherein said one or more ozone-reactive substances comprise said hydrogen, said carbon monoxide, said nitrogen compounds comprise nitrogen oxides, said sulfur compounds comprise sulfur dioxide and hydrogen sulfide, said organic compounds comprise $C_1$–$C_3$ hydrocarbons, said microbiological comprise living organisms and viruses or mixtures thereof.

19. The process of claim 7 or claim 15, further comprising the step of removing gaseous impurities from said oxygen-enriched stream prior to step (c).

20. The process of claim 19, wherein said step of removing gaseous impurities from said oxygen-enriched stream comprises drying said oxygen-enriched stream.

21. The process of claim 19, wherein said step of removing gaseous impurities from said oxygen-enriched stream comprises adsorptive separation, membrane separation or combinations thereof.

22. The process of claim 21, wherein said step of removing gaseous impurities from said oxygen-enriched stream comprises adsorptive separation carried out using one or more zeolites, activated carbon, carbon molecular sieves or combinations thereof.

* * * * *